(12) United States Patent
Philippe et al.

(10) Patent No.: US 11,090,968 B2
(45) Date of Patent: Aug. 17, 2021

(54) METHOD FOR MANUFACTURING A DATA MEDIUM AND DATA MEDIUM THUS OBTAINED

(71) Applicant: FASVER, Baillargues (FR)

(72) Inventors: Eric Philippe, Eyguieres (FR); Laurence Bes, Jacou (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/523,915

(22) PCT Filed: Nov. 3, 2015

(86) PCT No.: PCT/FR2015/052969
§ 371 (c)(1),
(2) Date: May 2, 2017

(87) PCT Pub. No.: WO2016/071627
PCT Pub. Date: May 12, 2016

(65) Prior Publication Data
US 2017/0313120 A1    Nov. 2, 2017

(30) Foreign Application Priority Data

Nov. 4, 2014  (FR) ..................... 14.60646

(51) Int. Cl.
*B42D 25/351* (2014.01)
*B42D 25/41* (2014.01)
(Continued)

(52) U.S. Cl.
CPC .......... *B42D 25/351* (2014.10); *B41M 3/142* (2013.01); *B41M 5/28* (2013.01); *B41M 5/284* (2013.01);
(Continued)

(58) Field of Classification Search
CPC .... B42D 25/351; B42D 25/378; B42D 25/41; B41M 3/142; B41M 5/284; C09D 11/037; C09D 11/107; C09D 11/50; D21H 21/48
See application file for complete search history.

(56) References Cited

U.S. PATENT DOCUMENTS 4,142,782 A * 3/1979 O'Brian ................ G02F 1/0147
                                                    359/288
5,232,527 A   8/1993 Vernhet et al.
(Continued)

FOREIGN PATENT DOCUMENTS

CA      2 716 892 A1   9/2009
DE  10 2008 011 299 A1   9/2009
(Continued)

OTHER PUBLICATIONS

International Search Report, dated Feb. 10, 2016, from corresponding PCT application.

*Primary Examiner* — David R Dunn
*Assistant Examiner* — Christopher E Veraa
(74) *Attorney, Agent, or Firm* — Levenfeld Pearlstein, LLC

(57) ABSTRACT

Disclosed is a method for manufacturing a multilayer data medium (1), in which method: a multilayer data medium, including at least one transparent security layer (16), and at least one marking layer (17), sensitive to electromagnetic-marking radiation (5), are selected; the transparent security layer (16) includes at least one semi-transparent printed image including at least one thermochromic dye; at least one marking (30) is made using the electromagnetic-marking radiation, through the printed image; the semi-transparent printed image reveals, in a first state referred to as the inactivated state, at least one semi-transparent visible pattern that makes it possible, after the marking step, to view the marking (30) through the image, the pattern not being visible (Continued)

Figure 1:
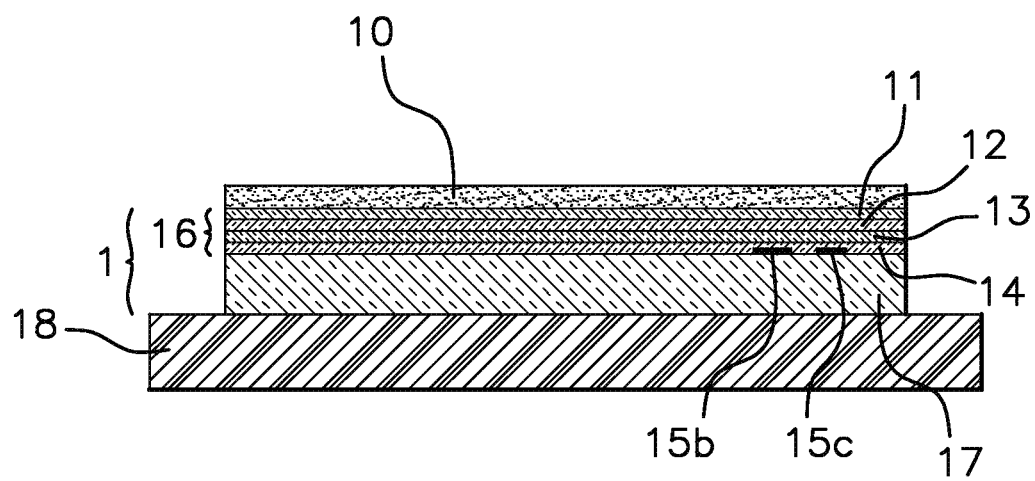

in a second state, referred to as the activated state. The invention also relates to a multilayer data medium (1).

13 Claims, 3 Drawing Sheets

(51) Int. Cl.
*B42D 25/378* (2014.01)
*B41M 3/14* (2006.01)
*C09D 11/50* (2014.01)
*B41M 5/28* (2006.01)
*B42D 25/21* (2014.01)
*B42D 25/45* (2014.01)
*C09D 11/037* (2014.01)
*C09D 11/107* (2014.01)
*B41M 5/26* (2006.01)

(52) U.S. Cl.
CPC ............ *B42D 25/21* (2014.10); *B42D 25/378* (2014.10); *B42D 25/41* (2014.10); *B42D 25/45* (2014.10); *C09D 11/037* (2013.01); *C09D 11/107* (2013.01); *C09D 11/50* (2013.01); *B41M 3/14* (2013.01); *B41M 5/26* (2013.01)

(56) References Cited

U.S. PATENT DOCUMENTS

| | | | | |
|---|---|---|---|---|
| 5,465,301 A * | 11/1995 | Jotcham | ................ | D21H 21/42 283/72 |
| 5,558,700 A * | 9/1996 | Shibahashi | ............ | B41M 5/305 106/31.15 |
| 5,873,604 A * | 2/1999 | Phillips | .................... | B41M 3/14 283/58 |
| 7,674,747 B1 * | 3/2010 | Long | ....................... | D06P 1/004 503/201 |
| 8,002,851 B2 * | 8/2011 | Fyvie | .................... | C09D 11/50 106/31.13 |
| 8,921,264 B2 * | 12/2014 | Clayton | ................... | B42D 5/00 503/201 |
| 9,158,141 B2 * | 10/2015 | DeFranks | ............... | G02F 1/132 |
| 2006/0023132 A1 * | 2/2006 | Mengel | ................. | B42D 25/29 349/20 |
| 2006/0145469 A1 | 7/2006 | Lubrino et al. | | |
| 2006/0228498 A1 * | 10/2006 | Parr | ......................... | B44F 5/00 428/29 |
| 2007/0167325 A1 * | 7/2007 | Leroux | .................... | B41M 5/28 503/201 |
| 2008/0050540 A1 * | 2/2008 | Christofer | ................. | B44F 1/06 428/13 |
| 2008/0090029 A1 * | 4/2008 | Hoshino | ................ | G02B 5/287 428/29 |
| 2009/0322070 A1 * | 12/2009 | Reichelsheimer | ..... | B41M 3/142 283/5 |
| 2010/0164219 A1 * | 7/2010 | Jeacock | ................ | B42D 25/369 283/94 |
| 2010/0245044 A1 * | 9/2010 | Dietemann | ........... | D21H 21/48 340/5.86 |
| 2012/0263893 A1 | 10/2012 | Endres et al. | | |
| 2017/0073537 A1 * | 3/2017 | Chin | ....................... | C09D 11/50 |

FOREIGN PATENT DOCUMENTS

| | | |
|---|---|---|
| EP | 0 271 941 A1 | 6/1988 |
| EP | 1 066 978 A2 | 1/2001 |
| EP | 2 499 001 B1 | 1/2014 |
| FR | 2 834 484 A1 | 7/2003 |
| WO | 00/24587 A1 | 5/2000 |
| WO | 2009/106242 A1 | 9/2009 |
| WO | 2011/057760 A1 | 5/2011 |

* cited by examiner

METHOD FOR MANUFACTURING A DATA MEDIUM AND DATA MEDIUM THUS OBTAINED

The invention relates to a method for manufacturing a multilayer data medium, and to a multilayer data medium.

The invention relates more particularly to a multilayer data medium aiming to protect a surface portion of an official document bearing inscriptions. The invention likewise relates to an official document protected using such a multilayer data medium.

Throughout the text, the term "visible light" is understood to mean any light whose spectral composition is located in the visible spectrum, in wavelengths between 0.4 µm and 0.8 µm.

Throughout the text, the term "semi-transparent image" is understood to mean any image which, when it covers a document or product, allows underlying characters, marks, or patterns of the document to be distinguished—in particular read—through this image when viewed normally (without a specific instrument), at least under illumination with visible light. In particular, a semi-transparent image does not totally mask the underlying characters, marks and/or patterns of the document, at least under illumination with visible light. Throughout the text, "inscription" or "inscription to be read" designates any sign or pattern produced on a layer of a document able to be read by a human, at least under certain conditions (in particular under normal illumination with visible light; and/or under specific illumination; and/or after activation of an electronic device (screen) or the like . . . ). This may include variable personalising details of an official document or common and/or security details; texts (manually written or imprinted characters); codes (ASCII, universal codes which are read optoelectronically such as bar codes . . . ); images or photographs . . . .

Numerous protective security methods and devices for official documents are known (passports, visas, identity cards, driving licences, logbooks, bank cards, bank cheques, diplomas, certificates, transport documentation, access control cards, badges, labels, legal documents, contracts, legal registers, land registry documents, trust documents, bank notes, manufacturing drawings or other plans . . . ) having inscriptions, in particular inscriptions to be read such as variable details (surname, first name, address, photo, signature . . . of a holder or parties . . . ) and/or common details (security patterns, character boxes, frames, names of fields, seals, holograms, signatures, values, . . . ) which should be protected against falsification attempts and/or counterfeits and/or for authentication and/or for ensuring the integrity thereof (i.e. the fact that they have not been altered or modified).

US 2006/0145469 describes a document, in particular a cheque, protected against falsification, comprising a first mark formed using an ink providing a pearlescent effect and a second mark formed using a thermochromic ink. The mark formed using a thermochromic ink is opaque and is applied only on a limited portion of the document. The mark formed using a thermochromic ink is visible at ambient temperature and disappears when the temperature thereof is increased, e.g. by applying a thumb to said mark, the mark reappearing upon returning to the temperature after removal of the heat source.

There is also known from WO 2009/106242 and CA 2 716 892 a security device comprising at least one layer of thermochromic ink covering and hiding two patterns, the first pattern becoming visible when the thermochromic ink is subjected to a first temperature increase and the second pattern becoming visible when the thermochromic ink is subjected to a second temperature increase, different from the first increase. The layer of thermochromic ink forms an opaque pattern of limited size on the document to be protected.

From EP 2 499 001 a multilayer data medium is likewise known comprising a marking layer which is sensitive to radiation outside of the visible spectrum range, and comprising a hidden marking, and a thermochromic covering layer which is arranged above the marking layer and is opaque below its changeover temperature so as to mask said hidden marking and is translucent or transparent above its changeover temperature so as to render said hidden marking visible. To this end, the thermochromic covering layer of EP 2 499 001 must, in practice, be black, or at the least very dark. The method of manufacturing a multilayer data medium of EP 2 499 001 also limits the choice of thermochromic pigments which are compatible therewith as well as the choice of laser radiation which may be used.

In these known devices, the patterns formed using thermochromic ink are opaque at a temperature lower than the thermochrome-activation temperature and become colourless and transparent at a temperature equal to and higher than the thermochrome-activation temperature. The patterns formed using thermochromic ink are thus transparent only in their activated state and do not allow information printed on the document to be protected to be seen in their non-activated state.

Furthermore, the thermochromic images of such known devices are limited in terms of printing sharpness and richness of colours.

The invention aims to overcome the disadvantages of the different devices of the prior art and to propose a method for manufacturing a multilayer data medium, and a multilayer data medium, allowing inscriptions, which are to be protected and are borne by—in particular located on—said data medium or an official document, to be permanently seen.

The invention also aims to propose a method for manufacturing a multilayer data medium, and a multilayer data medium, allowing personalised marking to be formed during a final step in the method for manufacturing said multilayer data medium.

The invention also aims to propose a method for manufacturing a multilayer data medium, and a multilayer data medium, providing first level security which can be checked by normal viewing without the need for a specific instrument such as a UV lamp, for example.

The invention also aims to propose a method for manufacturing a multilayer data medium, and a multilayer data medium, allowing quick authentication of a document, in particular an official document and without the need for the document to be inclined in a particular way or to be deformed.

The invention aims to propose a durable multilayer data medium, of which in particular the service life is greater than 1 year and can last up to 10 years or more.

The invention also aims to propose a multilayer data medium which can be in the form of a card, in particular a rigid polycarbonate card.

To this end, the invention relates to a method for manufacturing a multilayer data medium, wherein:

a multilayer data medium is selected comprising at least one security layer and at least one layer, named marking layer, which is sensitive to electromagnetic marking radiation, said marking layer being arranged at least in part facing said security layer, said security layer comprises at least one printed image comprising at least one thermochromic pigment adapted to change colour upon a predetermined temperature variation, in a marking step, at least one mark is formed in said marking layer using said electromagnetic marking radiation through said printed image, characterised in that:

said printed image is a semi-transparent printed image which causes at least one semi-transparent visible pattern to appear (i.e. at least under illumination with visible light) in a first state, named non-activated state, at at least a first temperature, allowing, after said marking step, said mark to be seen through this image, said pattern not being visible in a second state, named activated state, at at least a second temperature which is different from the first temperature, said printed image is prepared from at least one printing composition comprising at least one transparent binder and a predetermined proportion of thermochromic pigments adapted to form a semi-transparent printed image allowing said mark to be seen through this image in the non-activated state of the thermochromic pigments.

The invention relates to a multilayer data medium able to be obtained by a method according to the invention. The invention thus relates to a multilayer data medium comprising:

at least one security layer comprising at least one printed image comprising at least one thermochromic pigment adapted to change colour upon a predetermined temperature variation, at least one layer, named marking layer, which is sensitive to electromagnetic marking radiation comprising at least one mark formed using said electromagnetic marking radiation, said marking layer being arranged at least in part facing said security layer, characterised in that:

said printed image is a semi-transparent printed image which causes at least one semi-transparent visible pattern to appear (i.e. at least under illumination with visible light) in a first state, named non-activated state, at at least a first temperature, allowing said mark formed using the electromagnetic marking radiation to be seen, said pattern not being visible in a second state, named activated state, at at least a second temperature which is different from the first temperature, said printed image is prepared from at least one printing composition comprising at least one transparent binder and a predetermined proportion of thermochromic pigments adapted to form a semi-transparent printed image allowing said mark to be seen through this image in the non-activated state of the thermochromic pigments.

The invention also relates to an official document comprising at least one such multi-layer data medium.

In a wholly unexpected manner, the inventors have observed that it is possible to print an image using at least one printing composition comprising thermochromic pigments and to obtain a printed image which is semi-transparent and coloured (having a semi-transparent visible pattern) in a non-activated state of the thermochromic pigments, at at least a first temperature, and is completely transparent and colourless (without a semi-transparent visible pattern) in an activated state of the thermochromic pigments, at at least a second temperature which is different from the first temperature. A multilayer data medium is thus obtained which is adapted to be able to cover inscriptions (in particular marks obtained by marking using marking radiation such as a laser), e.g. inscriptions located on an official document, without preventing them from being seen and/or read, at least under illumination with visible light.

A method and a multilayer data medium in accordance with the invention thus allow the security of official documents to be improved because they thereby allow larger surface portions thereof to be protected, in particular the surface portions bearing inscriptions to be read, for which is it desirable to always allow reading thereof (in the activated state and in the non-activated state).

Furthermore, the inventors have noted, in an unexpected manner, that is possible to form marking using electromagnetic marking radiation in a layer lying under said security layer, through such a semi-transparent printed image. This allows the security level of the official documents to be increased further because such a mark is arranged within the multilayer data medium and not directly on the surface thereof. On the other hand, the thus formed mark is always visible through the thermochromic semi-transparent printed image (in the activated state and in the non-activated state of the thermochromic pigments), at least under illumination with visible light. A method in accordance with the invention allows on the other hand at least one additional security element (said mark formed using electromagnetic marking radiation) to be added at an advanced stage of the method for manufacturing an official document.

It should be noted that said mark formed using electromagnetic marking radiation can be formed of variable details for personalising an official document or common and/or security details, texts or characters, images or photographs . . . . Each mark can extend over at least one surface portion of said marking layer and of said data medium.

In certain possible embodiments of the invention, said transparent security layer can be a layer forming part of an official document, in particular an outer layer thereof, e.g. when the official document is a card made of synthetic material (e.g. a card formed of several superposed and laminated polycarbonate layers). In these embodiments, said semi-transparent printed image can be printed on such an outer layer of the official document prior to hot lamination under pressure of different layers forming the official document or, in contrast after such a lamination. Said semi-transparent printed image is printed so as to cover the inscriptions to be protected borne by an underlying layer of the document.

In fact, the inventors have noted that a semi-transparent printed image in accordance with the invention, comprising at least one thermochromic pigment, is compatible with materials such as polycarbonate and allows cards to be prepared, in particular cards comprising at least one layer comprising polycarbonate.

In particular, advantageously and in accordance with the invention, said electromagnetic marking radiation is laser radiation. It may be any laser marking radiation selected from infrared (IR) laser radiation, visible laser radiation and ultraviolet (UV) laser radiation. The frequency and pump power of the laser are adapted so as to allow the desired mark to be formed in the marking layer.

Advantageously and in accordance with the invention, the marking layer is selected so as to be sensitive to the electromagnetic marking radiation to be used. In particular, advantageously and in accordance with the invention, the marking layer is formed from at least one material adapted to allow the formation of at least one mark (in the form of an embossed and/or debossed image or pattern and/or having a different colour or shade of colour distinct from that of the marking layer prior to forming said mark). In particular, advantageously and in accordance with the invention, the marking layer is formed from at least one material which is sensitive to electromagnetic marking radiation selected from metal materials, polymer materials, composites thereof and mixtures thereof. In particular, advantageously and in accordance with the invention, the marking layer is formed from at least one polymer material comprising additives such as carbon or metal oxides allowing said material to be rendered sensitive to the electromagnetic marking radiation. Such additives allowing a marking layer to be rendered sensitive to electromagnetic marking radiation are for example selected from carbon black, graphite, titanium dioxide ($TiO_2$), $Sn(Sb)O_2$, anthracene or even dyes which are absorbent in the infrared spectrum range such as perylenes/rylenes, pentaerythritol, copper phosphate, hydroxylates, molybdenum disulphide or bismuth oxychloride. It is, of course, also possible to use a marking layer formed of at least one polymer material which is sensitive to electromagnetic marking radiation (intrinsically, without the need for sensitising additives).

In particular, advantageously and in accordance with the invention, the marking layer and the electromagnetic marking radiation, in particular the laser radiation, are selected such that said electromagnetic marking radiation allows the formation of a mark as previously defined in the marking layer. It will be necessary, for example, to use a marking laser having a radiation in the infrared spectrum range in the case where the marking layer comprises only additives which are absorbent in the infrared spectrum range.

Advantageously and in accordance with the invention, said marking layer extends in a similar format or smaller size format than that of the security layer and/or multilayer data medium.

In the embodiments in which the data medium is a card formed of several superposed and laminated polycarbonate layers, the marking step can be performed prior to hot lamination under pressure of the different layers forming the official document, or on the contrary after such lamination, the marking being formed through the semi-transparent printed image of the security layer.

In particular, advantageously and in accordance with the invention, the first temperature is lower than the second temperature. In this manner, an increase in temperature allows a transition from the non-activated, transparent and coloured state to the activated, transparent and colourless state.

In particular, advantageously and in accordance with the invention, the thermochromic pigments are selected such that they have at least one activation temperature between 20° C. and 50° C., in particular between 25° C. and 45° C.

In particular, advantageously and in accordance with the invention, thermochromic pigments are selected such that they are in the transparent and coloured state (non-activated state) at ambient temperature (in particular at a temperature between 15° C. and 35° C.).

A transition can thus be made from the non-activated state to the activated state by heating achieved by simply contacting the surface of a printed image in accordance with the invention by a finger or hand, and possibly slightly rubbing fingers on the surface of a printed image in accordance with the invention or even using a tool having a tip made of elastomer material (rubber or gum-like).

The transparent security layer can be formed of the printed image itself using said at least one printing composition or can comprise at least one layer formed of any material suitable to be able to be printed, on which said semi-transparent image is printed. Advantageously and in accordance with the invention, the transparent security layer—in particular the transparent multilayer data medium—comprises at least one material selected from cellulose materials and polymer materials. Advantageously and in accordance with the invention, a security layer is used comprising at least one layer formed of at least one material selected from the group formed of transparent thermoplastic materials and transparent synthetic papers. In particular, advantageously and in accordance with the invention, a security layer is used comprising at least one layer formed of at least one material selected from the group formed of transparent polycarbonates, transparent polyesters, transparent PVC, polyurethane varnishes and vinyl varnishes (or varnishes of the polyurethane or vinyl type).

In particular, advantageously and in accordance with the invention, the multilayer data medium is borne by a support film arranged on at least one portion of the surface of an outer layer of said multilayer data medium. In particular, in embodiments in which the multilayer data medium is borne by a support film, the multilayer data medium in accordance with the invention is advantageously a security device forming a transfer device—in particular a hot transfer device. Therefore, advantageously and in accordance with the invention, the support film bearing the multilayer data medium is adapted to permit the transfer, in particular the hot transfer, of the multilayer data medium on said surface portion, by lamination of the security device on a surface portion of an official document. Advantageously and in accordance with the invention, the multilayer data medium is transparent and is formed of at least one polymer material selected from polycarbonates, polyvinyl chlorides (PVC), polyethylene terephthalates (PET), polyethylene terephthalates glycol modified (PETG), copolymers thereof and mixtures thereof.

The support film bearing said multilayer data medium can be formed of any material, whether rigid or flexible, multilayered or not, and can be formed of at least one material selected from cellulose materials and polymer materials. Advantageously and in accordance with the invention, the support film is formed of at least one cellulose material selected from papers, in particular security papers. Advantageously and in accordance with the invention, the support film is formed of at least one polymer material selected from polycarbonates, polyvinyl chlorides (PVC), polyethylene terephthalates (PET), polyethylene terephthalates glycol-modified (PETG), copolymers thereof and mixtures thereof.

The assembly formed by said support film and said multilayer data medium can be, for example, a transfer film sold by the company FASVER Baillargues (France) under the name Fasprotek™ or Passprotek™, or Fasfilm™ or even Transfilm™, and/or in accordance with EP-0271941 and U.S. Pat. No. 5,232,527, the multilayer data medium comprising at least one semi-transparent printed image in accordance with the invention.

Furthermore, advantageously and in accordance with the invention, said semi-transparent image is a coloured image. The coloured image can, for example, comprise a single colour (monochromatic image) representing a pattern representing an object, characters, inscriptions or even a photo, or can simply be a continuous unified block of one colour across the entire surface of the transparent security layer.

In particular, advantageously and in accordance with the invention, said semi-transparent image is a polychromatic image.

Advantageously and in accordance with the invention, said semi-transparent image is arranged at least in part facing said marking layer.

Advantageously and in accordance with the invention, said semi-transparent image is printed on said transparent multilayer data support, preferably on a face not forming an outer face of the multilayer data medium, nor of the official document. The semi-transparent image can be printed using any printing technique, for example screen printing, ink-jet printing or even flexography. In particular, advantageously and in accordance with the invention, said semi-transparent image can be printed using a printing technical allowing extremely varied patterns to be formed, in particular fine and complex patterns. It is in particular possible to obtain graphics or texts with a line width of less than 200 μm, in particular a line width of less than 100 μm. Therefore, advantageously and in accordance with the invention, said semi-transparent image is printed with a number of lines greater than 80 lines per inch, and in particular with a number of lines greater than 120 lines per inch.

In particular, advantageously and in accordance with the invention, said semi-transparent image is printed by screen printing in accordance with the four-colour process. In fact, the inventors have surprisingly noted that it is possible to print a printing composition comprising thermochromic pigments in accordance with this technique. It is thus possible to prepare a wide variety of semi-transparent images in terms of shapes, sizes and colours.

The four-colour printing process thus allows a large range of colours to be reproduced using the following colours: cyan, magenta, yellow and black. Thus, advantageously and in accordance with the invention, said semi-transparent image is printed by successively printing:
- a first printing composition comprising cyan thermochromic pigments,
- a second printing composition comprising magenta thermochromic pigments,
- a third printing composition comprising yellow thermochromic pigments, and
- a fourth printing composition comprising black thermochromic pigments.

The semi-transparent printed image comprises at least one transparent binder adapted so as not to interfere with how the inscriptions borne by the official document to be protected are seen. Advantageously and in accordance with the invention, said transparent binder is selected from the group formed by transparent polymer binders.

Advantageously and in accordance with the invention, the transparent binder is selected from the group formed by transparent thermoplastic resins. In particular, advantageously and in accordance with the invention, said transparent binder is selected from the group formed of polymer materials such as polycarbonates, polyesters, polyacrylates, polyacrylics, in particular polymethacrylates, polyurethanes, polyethers, polycaprolactones, mixtures thereof and copolymers thereof. The binder is, for example, a methyl methacrylate copolymer such as a resin sold by DOW CHEMICAL (Midland, USA) under the name Paraloid B®.

Advantageously and in accordance with the invention, said semi-transparent image is printed using at least one (ink) printing composition comprising thermochromic pigments and at least one transparent binder.

Advantageously and in accordance with the invention, said semi-transparent image is printed using at least one printing composition comprising thermochromic pigments selected from the group formed of capsules (micro-capsules) comprising at least one leuco dye (also named "colour developer"), at least one weak acid and at least one organic liquid (as a solvent). The thermochromic pigments thus comprise, within each micro-capsule, a dyeing composition comprising at least one leuco dye, at least one weak acid and at least one organic liquid. Such thermochromic pigments are known and are sold, for example, by the company Polychrom CO LTD (Ansan, Korea). They have, for example, an average size between 1 μm and 100 μm, in particular between 2 μm and 60 μm.

The proportion of thermochromic pigments in the printing composition is selected so as to obtain a semi-transparent image, and thus to allow inscriptions printed on said official document to be seen through the semi-transparent image, at least under illumination with visible light. Advantageously and in accordance with the invention, said semi-transparent image is printed using at least one printing composition comprising between 9% and 22% by weight of thermochromic pigments.

Cyan can be obtained by mixing a green dye and a blue dye, e.g. 4-[4,4'-bis(dimethylamino)benzhydrylidene]cyclohexa-2,5-dien-1-ylidene]dimethylammonium chloride (named "Crystal Violet Lactone") for blue and 3-diethylamino-7-dibenzylaminofluorane for green.

Magenta can be obtained by mixing a red dye and a blue dye.

For red, several molecules can be used, such as 3,3-bis (1-octyl-2-methylindol-3-yl)phthalide, 6'-ethyl(p-tolyl)amino]-2'-methylspiro[isobenzofuran-1(3H),9'-[9H]xanthen-3-one, or even 9-[ethyl(3-methylbutyl)amino]spiro[12H-benzo[a]xanthene-12,1'-(3'-H)-isobenzofurane]-3'-one.

For yellow, N,N-dimethyl-4-[2-[2-(octyloxy)phenyl]-6-phenyl-4-pyridinyl]benzeneamine can be used for example.

The weak acid is e.g. selected from bisphenol A or bisphenol S acids.

The solvent contained in the thermochromic pigment micro-capsules is, in general, a polar solvent such as an alcohol or an ester.

The polymer envelope of each micro-capsule is e.g. formed of an encapsulation polymer such as melamine formaldehyde.

The printing composition can further comprise at least one solvent, for example an aqueous or organic solvent. Advantageously and in accordance with the invention, the solvent is, for example, dipropylene glycol monomethyl ether and/or ethyl 3-ethoxypropanoate.

Advantageously and in accordance with the invention, a solvent is selected which is adapted to allow the printing of a semi-transparent image of a device in accordance with the invention. In particular, advantageously and in accordance with the invention, said solvent is selected such that it is compatible with the thermochromic pigments of the printing composition used, i.e. such that it is not likely to damage the polymer micro-capsules of said thermochromic pigments nor interfere with the dyeing composition contained in the micro-capsules of said thermochromic pigments (leuco dye and weak acid system).

Advantageously and in accordance with the invention, each printing composition thus comprises:
- between 9% and 22% by weight of thermochromic capsules,
- between 30% and 45% by weight of transparent binder,
- between 25% and 50% by weight of solvent.

Advantageously and in accordance with the invention, said multilayer data medium is applied to a surface portion of an official document comprising inscriptions such that the semi-transparent image covers said inscriptions at least in part. Large-size, transparent protective devices are thus obtained which allow inscriptions printed on the official document to be seen.

Advantageously and in accordance with the invention, said semi-transparent image extends in a similar format to that of the transparent multilayer data medium. In fact, the large-size multilayer data media are more difficult to falsify, and in particular to reproduce. Furthermore, the large-size multilayer data media are also more difficult to remove and re-use on another document. A method and a multilayer data medium in accordance with the invention thus allow large-size protective devices to be prepared without preventing inscriptions to be read—which are printed on the official document—from being seen.

On the other hand, it is possible to print other types of security ink on the surface of the official document and/or on and/or in the multilayer data medium or to add any other protective security device so as to further increase the protection thereof. It can be, for example, at least one inscription formed of a security ink composition selected from the group formed of inks which are photoluminescent—in particular under ultraviolet illumination, fluorescent inks, photochromic inks, iridescent inks, interferential pigment inks, soluble dye inks, and soluble binder inks. Advantageously and in accordance with the invention, the official document and/or the multilayer data medium can also comprise at least one security marking, in particular selected from the group of holographic marks and metallised marks (i.e. formed of at least one printing with an ink producing a metallic effect and/or incorporating metallic particles and/or a metal layer).

It is possible to apply an additional protective varnish layer on the free surface of the final thermochromic printing composition layer of the transparent security layer so as to protect the semi-transparent image of the multilayer data medium thus obtained. However, the application of such a protective varnish is not absolutely required.

It is also possible to apply an adhesive layer over the transparent multilayer data medium (on the free surface of the final thermochromic printing composition layer or even on the possible protective varnish layer) so as to allow the transfer of the protective device and the attachment thereof to an official document to be protected.

Furthermore, although it is not absolutely required to add anti-UV additives, HALS ("Hindered Amine Light Stabilizers")-type additives or even antioxidants in the thermochromic printing composition, it is possible to do so, however these must be selected to be compatible with being used in the thermochromic printing composition.

Furthermore, in order to improve the compatibility between said at least one thermochromic printing composition and the transparent multilayer data medium, it is possible to select the binder and/or the transparent multilayer data medium such that they are mainly formed from at least one single polymer material.

The invention relates to an official document comprising at least one data medium in accordance with the invention.

An official document in accordance with the invention can in particular be selected from the group formed by passports, passport pages, customs documents, visas, identity cards, driving licences, vehicle registration cards (logbooks), bank cards, loyalty cards, bank cheques, diplomas, certificates, transport documentation, access control cards, badges, labels, legal documents, contracts, legal registers, land registry documents, trust documents, bank notes, packages and manufacturing drawings.

The invention also relates to a method and a multi-layer data medium as well as an official document, which are characterised in combination by all or some of the features mentioned above or below.

Figure 2:
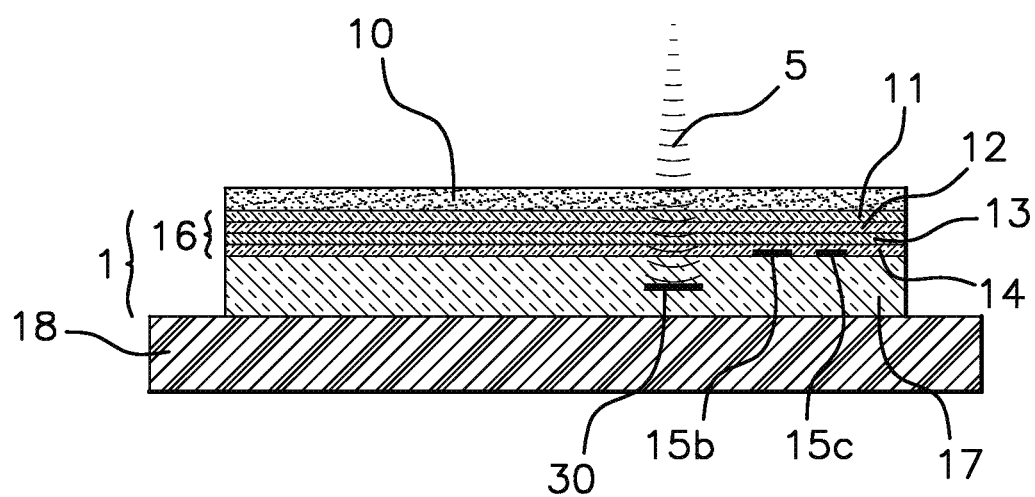
Figure 3:
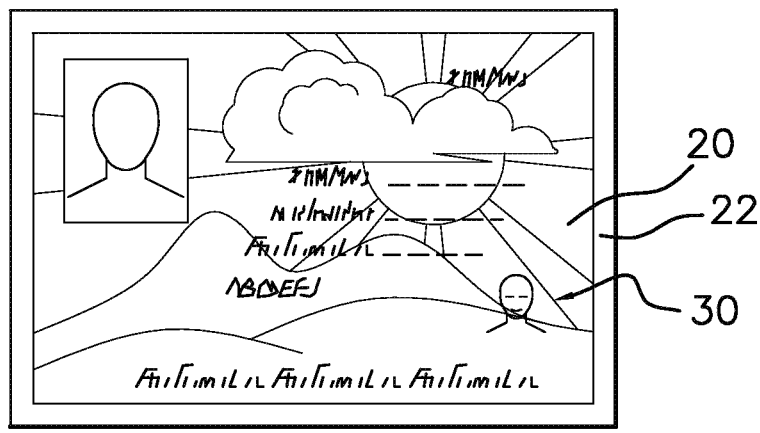
Figure 4:
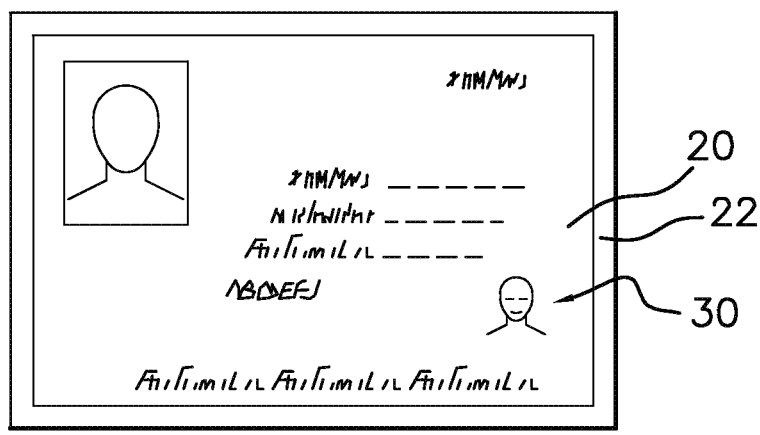
Figure 5:
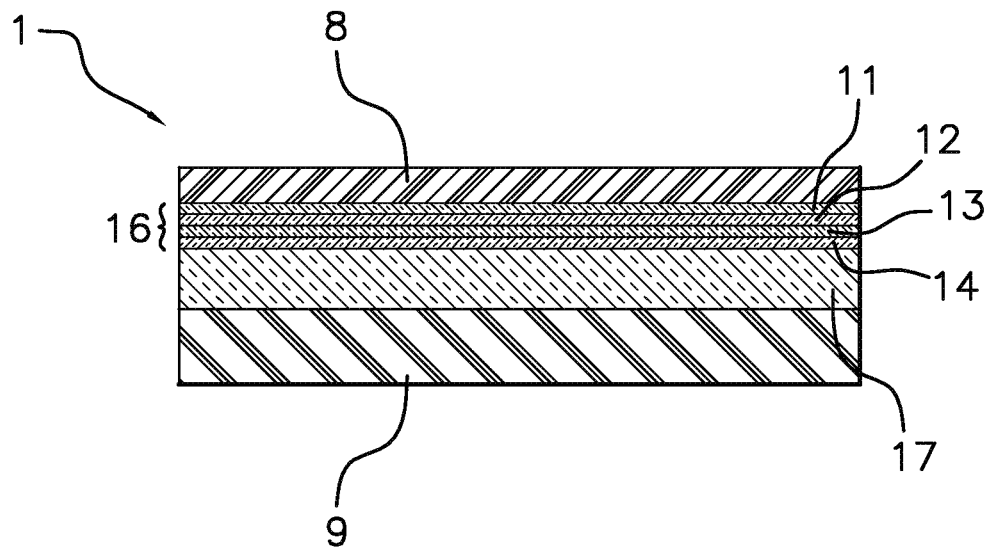
Figure 6:
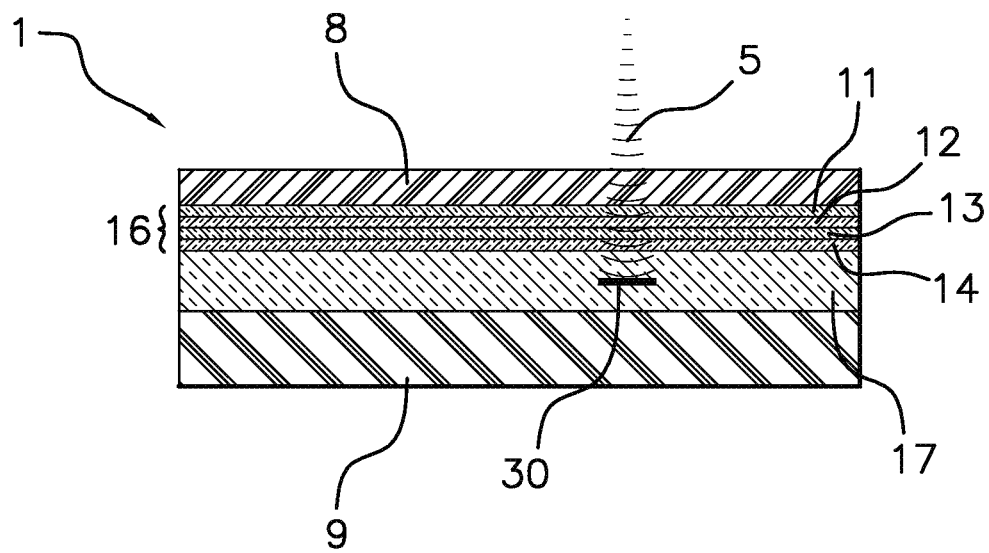

Other aims, features and advantages of the invention will become apparent upon reading the following description of one of its preferential embodiments given by way of non-limiting example and with reference to the attached figures in which:

FIGS. 1 and 2 are cross-sectional schematic views of a multilayer data medium in accordance with a first embodiment in accordance with the invention illustrating a method for manufacturing such a data medium, FIG. 3 is a schematic view of an official document comprising a multilayer data medium in accordance with the invention, the semi-transparent image being visible, FIG. 4 is a schematic view of an official document comprising a multilayer data medium in accordance with the invention, the semi-transparent image not being visible, FIGS. 5 and 6 are cross-sectional schematic views of a multilayer data medium in accordance with a second embodiment of the invention illustrating a method for manufacturing such a data medium.

For ease of illustration, FIGS. 1 to 6 are not shown to scale. In particular, in FIGS. 1, 2, 5 and 6, the thicknesses are shown in an exaggerated manner.

A transparent multilayer data medium 1 incorporating a thermochromic polychromatic semi-transparent image is formed. The multilayer data medium 1 comprises at least one transparent security layer 16 comprising the semi-transparent image and at least one layer, named marking layer 17, which is sensitive to electromagnetic marking radiation 5, said marking layer being arranged at least in part facing said security layer 16. The multilayer data medium 1 is borne by a support film 18.

This transparent multilayer data medium 1 can form a heat transfer, i.e. can be used to be applied and transferred by hot lamination onto a surface portion of an official document 22, as shown in FIGS. 2 and 3, in particular so as to protect same against falsification and/or to authenticate the official document and/or the variable or common inscriptions previously printed on this surface portion and/or to ensure the integrity thereof.

In a first step of a method for manufacturing the multilayer data medium (FIGS. 1 and 5), said semi-transparent image is prepared.

At least one printing composition (or thermochromic ink) is prepared. Each printing composition comprises:
between 9% and 22% by weight of thermochromic pigments (capsules),
between 30% and 45% by weight of at least one transparent binder, such as a thermoplastic resin, in particular an acrylic thermoplastic resin,
between 25% and 50% by weight of solvent, such as dipropylene glycol monomethyl ether and/or ethyl 3-ethoxypropanoate.

The thermochromic micro-capsules comprise at least one leuco dye (also named "colour developer"), at least one weak acid and at least one organic liquid (such as a fatty acid ester).

The leuco dyes are molecules which can have two different forms: a coloured form and a colourless form.

Each thermochromic ink can also comprise any type of additive (in particular less than 5% by weight relative to the total weight of the thermochromic ink). For example, anti-UV additives such as hydroxyphenyl benzotriazole (BTZ) or 2-hydroxyphenyl-s-triazine (HDT) can be added.

From an image or photograph treated by subtractive colour synthesis, four framed negatives or films corresponding to the four primary colours (yellow, magenta, cyan, black) are obtained. The image is reproduced by successively printing the four filters of the image with the primary colours: cyan, magenta, yellow and black.

The four monochromatic filtered images are successively printed, e.g. by screen printing, on a multilayer data medium 1. A separating vanish layer (not shown) may optionally be provided between each monochromatic filtered image. In a first embodiment illustrated in FIGS. 1 and 2, the multilayer data medium 1 is borne by a transparent support film 18 formed, for example, of polystyrene.

The multilayer data medium 1 can be transparent or semi-transparent. It comprises a marking layer 17 formed for example of a continuous layer of polyurethane comprising additives allowing it to be rendered sensitive to laser marking. The assembly formed by the marking layer 17 and the transparent support film 18 can be, for example, a Fasprotek™ or Transfilm™ (FASVER, Baillargues, France) film rendered sensitive to laser marking using carbon black, $Sn(Sb)O_2$ or titanium dioxide. Alternatively, the multilayer data medium 1 can also comprise a marking layer 17 formed of a single layer (not supported by a medium) formed for example of a Fasfilm™ (FASVER, Baillargues, France) film. In this case, the continuous layer is for example formed of polyethylene terephthalate or polycarbonate which are sensitive to laser radiation. The continuous layer forms a marking layer 17 which is sensitive to marking radiation such as a marking laser. Furthermore, in this latter case, the adhesive layer 10 is not necessary to allow the transfer by hot lamination of the multilayer data medium 1 to a surface portion of an official document.

Each multilayer data medium 1 can comprise a single separable layer of varnish. Each multilayer data medium 1 can incorporate printed security patterns 15*b*, 15*c* on and/or beneath the separable varnish layer, for example. These security patterns 15*b*, 15*c* can, for example, be formed of patterns which are visible only under certain illumination conditions (WO 0024587, FR 2834484), patterns whose appearance varies depending upon the viewing angle, iridescent patterns, patterns with interferential pigments . . . .

In the four-colour process, four thermochromic compositions are thus prepared. The first thermochromic composition 14 is printed in cyan using and reproducing the monochromatic filtered image (obtained using the cyan filter) respectively, so as to form a first semi-transparent thermochromic monochromatic image. Then, the second thermochromic composition 13 is printed thereabove in magenta using and reproducing the monochromatic filtered image (obtained using the magenta filter) respectively. Then, the third thermochromic composition 12 is printed thereabove in yellow using and reproducing the monochromatic filtered image (obtained using the yellow filter) respectively. Then, the fourth thermochromic composition 11 is printed thereabove in black using and reproducing the monochromatic filtered image (obtained using the black filter) respectively. A drying step can be provided between the printing of each thermochromic composition, at ambient temperature or e.g. using a flow of hot air.

Then, an adhesive layer 10 is printed on the last layer of the thus printed semi-transparent image. This adhesive layer allows the transfer of the multilayer data medium 1 and the attachment thereof to an official document.

A protective film (not shown) can likewise be added onto the adhesive layer.

In a second embodiment in accordance with the invention shown in FIGS. 5 and 6, the data medium 1 is in the general form of a sheet or card and thus has two opposing outer planar main faces and a relatively small thickness. Throughout the following, only a main face, named the outer face, is shown and described and has the features of the invention, it being understood that the other outer, main face can equally have the same features or, in contrast, can have other features. Consequently, it is assumed throughout the following that the face opposite the outer face in question is an outer main face of a base 9, without this implying any limitation whatsoever, such a base possibly not being present and/or itself being formed of a layer or a plurality of layers of various thicknesses, not described in this description.

In particular, the base 9 can be formed of at least one layer of thermoplastic material selected from among polycarbonates, PVCs, polyesters (polyethylene terephthalate PET, polyethylene terephthalate glycol PETG), co-extruded films of polyester and polycarbonate (PEC), synthetic papers (in particular selected from among the trust papers and paper sold under the trade mark Teslin® by the company PPG, Monroeville, USA, the paper sold under the trade mark Neobond® by the company Neenah Lahnstein, Lahnstein, Germany, and the paper sold under the trade mark Polyart® by the company Arjobex, Boulogne, France). Other examples are possible.

In this second embodiment of a manufacturing method and a multilayer data medium in accordance with the invention, said semi-transparent image is prepared as in the first embodiment described above but it is printed on a sheet 8 formed, for example, of polycarbonate (which is transparent and not sensitive to laser radiation). Once said semi-transparent image is printed on the sheet 8, said sheet is turned over and is placed on a set of sheets comprising at least one marking layer 17 and a white base 9. As can be seen in FIG. 5, the face of the sheet 8 on which said semi-transparent image has been printed is arranged in contact with the marking layer 17. FIG. 5 shows the data medium obtained after hot lamination under pressure of these different layers.

In a third embodiment of a manufacturing method and a multilayer data medium in accordance with the invention (not shown), the data medium can be similar to that of the first embodiment but in which the arrangement of the security layer 16 and the marking layer 17 is reversed, the marking layer 17 thus being arranged in contact with the adhesive 10. In this embodiment, the second marking step will be performed after the transfer of the data medium onto another document, e.g. a sheet of paper, the marking using laser marking radiation 5 being performed through said semi-transparent image so as to produce a mark 30 within the marking layer 17.

In a second step of a method for manufacturing the multilayer data medium (FIGS. 2 and 6), in the first embodiment and in the second embodiment, marking using a laser marking radiation 5 is performed through said semi-transparent image so as to produce a mark 30 within the marking layer 17.

In the first embodiment, a detachment layer can optionally be provided between the transparent multilayer data medium 1 and the transparent support film 18, so as to facilitate the removal of the transparent support film 18 once the protective device has been transferred onto a substrate such as an official document.

A transparent multilayer data medium 1 is thus obtained comprising a polychromatic semi-transparent printed image and a mark 30 obtained using laser radiation (shown in FIG. 2).

Then, if one is provided, the protective film is removed and the data medium 1 is applied onto the official document.

The transfer can be performed by lamination at about 100° C. to 120° C. for 5 seconds on an official document 22.

FIGS. 3 and 4 show an official document 22 (e.g. an identity card) to which the data medium 1 as prepared previously in FIGS. 1 and 3 is transferred.

The official document 22 has inscriptions, in particular variable details such as identity data. The inscriptions located on the official document 22 are preferably black and in particular of a colour (or shade) different from the colours of the patterns of the semi-transparent image covering them, so that it can be easily distinguished by the naked eye (under visible light).

In the non-activated state shown in FIG. 3, the polychromatic semi-transparent image is visible and allows the inscriptions to be seen through this image.

After slight heating in contact with fingers or the hand, a transition is made to the activated state shown in FIG. 4, and the semi-transparent polychromatic image is no longer visible (colourless), it still being possible to view the inscriptions through this image.

The mark 30 is visible in the non-activated state and in the activated state and is not hidden by the semi-transparent polychromatic image as can be seen in FIGS. 3 and 4.

It should be noted that in the example schematically illustrated in FIGS. 3 and 4, the patterns are shown with simple geometric shapes. However, the invention allows high-definition patterns to be formed with extremely complex and extremely fine shapes.

EXAMPLE 1

Four thermochromic inks are prepared, each comprising:
14% to 20% by weight of thermochromic pigments (capsules),
40 to 46% by weight of methyl methacrylate copolymer as a transparent binder, and
26% by weight of dipropylene glycol monomethyl ether,
10% of ethyl 3-ethoxypropanoate,
4% by weight of 2-hydroxyphenyl-s-triazine (anti-UV additive).

Each thermochromic ink has a viscosity in the order of 7 Pa·s.

The thermochromic capsules of the first thermochromic ink, for obtaining cyan, are formed from a mixture of green and blue thermochromic capsules in a proportion of about 50%-50%. For blue, the leuco dye contained in the microcapsules is "Crystal Violet Lactone", and for green the leuco dye contained in the microcapsules is 3-diethylamino-7-dibenzylaminofluorane. The first thermochromic ink comprises in total 20% by weight of thermochromic capsules.

The thermochromic capsules of the second thermochromic ink, for obtaining magenta, are formed from a mixture of red and blue thermochromic capsules in a proportion of about 50%-50%. The second thermochromic ink comprises in total 16% by weight of thermochromic capsules.

The thermochromic capsules of the third thermochromic ink are yellow thermochromic capsules. The third thermochromic ink comprises 20% by weight of thermochromic capsules.

The thermochromic capsules of the fourth thermochromic ink are black thermochromic capsules. The fourth thermochromic ink comprises 14% by weight of thermochromic capsules.

These thermochromic capsules are sold by the company Gem'innov® (Gémenos, France) and can be activated at the activation temperature of +30° C. The thermochromic capsules have an average size of 10 µm. The organic liquid contained in the thermochromic capsules is a fatty acid ester.

From an image or photograph treated by subtractive colour synthesis, four framed negatives or films corresponding to the four primary colours (yellow, magenta, cyan, black) are obtained. The image is reproduced by successively printing the four filters of the image with the four primary colours: cyan, magenta, yellow and black.

The four monochromatic filtered images are successively printed by screen printing on the free face of a transparent multilayer data medium borne by a support film (film sold under the trademark FASPROTEK® by the company Fasver (Baillargues, France) comprising at least one marking layer rendered sensitive to laser marking using carbon black, $Sn(Sb)O_2$ or titanium dioxide. Each screen printing screen is produced from a fabric with a mesh size of the order of 150 threads/cm, each thread having a diameter of 31 µm.

The first cyan thermochromic ink, the second magenta thermochromic ink, the third yellow thermochromic ink and the fourth black thermochromic ink are printed one after the other in a mirror-inverted manner by using and reproducing the monochromatic filtered image, obtained with each filter, respectively. After printing each thermochromic ink, it is dried using a continuous flow of air at 70° C. for 1 min 50 s. Then, an adhesive layer is printed on the fourth black thermochromic ink.

Then, the transparent multilayer data medium is applied onto an official document (passport page) by hot lamination.

After hot lamination, marking is performed using infrared laser marking radiation through said semi-transparent image so as to produce a laser mark within the marking layer arranged between the semi-transparent image and the support film of said data medium.

A marking laser (Nd:YAG—1064 nm) of the DPSS ("Diode Pulsed Solid State") type sold by the company IXLA under the name XP24® (business model) is used with standard settings (speed: 1000 mm/s; frequency: 20 kHz) so as to form a binary, black and white photo (or "bitmap") of a female face. The laser radiation is substantially perpendicular to the outer surface of the data medium and is arranged on the side of the data medium on which the thermochromic semi-transparent image is located, on the side opposite the support film. The infrared laser radiation passes through the security layer comprising the semi-transparent printed image and said security layer allows a laser mark to be formed in the underlying marking layer.

A transparent multilayer data medium is thus obtained which comprises a semi-transparent printed image and a mark, obtained by laser marking, arranged beneath said semi-transparent printed image, said semi-transparent printed image allowing the mark obtained by laser etching to be seen (in the activated state and also in the non-activated state of the thermochromic pigments).

The semi-transparent image thus arranged on the official document is polychromatic at ambient temperature (of the order of 18 to 25° C.) which does not prevent the inscriptions located on the official document from being read, and becomes invisible (because it is colourless) from 30° C. when the semi-transparent image is touched with the fingers or hand, for example. The image then once again becomes polychromatic spontaneously in a few seconds.

Furthermore, with the multilayer data medium of the example mentioned above applied onto an official document, the following light resistance tests are performed:
resistance to artificial light measured in accordance with the ISO 24789-1 and ISO 24789-2 standards: the samples are subjected to the radiation from a xenon arc lamp for 24 hours in the presence of the light filter and with the temperature of the black panel being 50° C.;

resistance to artificial light measured in accordance with the method defined by the International Civil Aviation Organisation ("ICAO") relating to the durability of passports (version 3.2 dated 30 Aug. 2006, paragraph 5.14): the samples are subjected to the radiation of an air-cooled xenon arc lamp in the presence of a filter for radiation with wavelengths of less than 310 nm;

resistance to ultraviolet A measured in accordance with the ISO 4582 and DIN 6167 standards: the samples are placed for 20 hours at 60° C. and at 0.72 W·m-2.nm-1.

After each test, the colour difference (before and after the test) is noted in the non-activated coloured state of the protective device. The colour difference is measured in accordance with the ISO 7724-3 standard using a DR LANGE® spectrocolorimeter (Dusseldorf, Germany). The colour differences (delta E) thus measured in each of the preceding light resistance tests are all less than 5, i.e. lower than the threshold for which the human eye perceives a difference in colour.

Similarly, with respect to the climatic resistance of the multilayer data medium of the example mentioned above applied onto an official document, the following tests are performed:

climatic resistance measured in accordance with the NF T 76-109 and DIN 6167 standards: the samples are subjected to 7 climatic ageing cycles, each for 12 hours (i.e. 84 hours in total) under the following conditions: 70° C. for 5 hours, cooling to −40° C. in 1 hour, −40° C. for 5 hours, then heated to 70° C., relative moisture content of 90%;

climatic resistance measured in accordance with the method defined by the International Civil Aviation Organisation ("ICAO") relating to the durability of passports (version 3.2 dated 30 Aug. 2006, paragraph 5.2): the samples are subjected to 7 climatic ageing cycles under the following conditions: 77° C. for 15 minutes, cooling to −32° C. in less than 60 seconds and maintaining at −32° C. for 15 minutes;

climatic resistance measured in accordance with the method defined by the International Civil Aviation Organisation ("ICAO") relating to the durability of passports (version 3.2 dated 30 Aug. 2006, paragraph 5.3): the samples are subjected to a temperature of 77° C. for 168 hours in the presence of a relative moisture content of 50%;

climatic resistance measured in accordance with the ISO 24789-1 and ISO 24789-2 standards, paragraph 5.7 (50° C.; relative moisture content of 93%), paragraph 5.8 (−35° C. for 15 min, heating to 50° C. in less than 15 s and maintaining at 50° C. for 15 min) and paragraph 5.9 (−35° C. for 30 min, +50° C. and 20% relative moisture for 6.5 hours, −35° C. for 30 min, then +50° C. and 85% relative moisture for 6.5 hours).

After each climatic resistance test, the colour difference (before and after the test) is noted in the non-activated coloured state of the multilayer data medium. The colour difference is measured in accordance with the ISO 7724-3 standard using a DR LANGE® spectrocolorimeter (Dusseldorf, Germany). The colour differences (delta E) thus measured in each of the preceding light resistance tests are all less than 5, i.e. lower than the threshold for which the human eye perceives a difference in colour. The thermochromic properties of the multilayer data medium were not affected.

EXAMPLE 2

In this example, polychromatic semi-transparent images are formed which are applied onto an official document bearing inscriptions, as stated in example 1, but varying the level of pigments in each of the four thermochromic inks. In should be noted that the thermochromic semi-transparent image is no longer visible below a certain level of pigments. The thermochromic semi-transparent image prevents the inscriptions located on the official document from being seen above a certain level of pigments.

The table below describes the results obtained.

| Proportion of thermochromic pigment (%) | Proportion of binder (%) | Proportion of solvent (%) | Proportion of additive (%) | Visual appearance |
|---|---|---|---|---|
| 27 | 36.5 | 33.5 | 3 | underlying inscriptions not visible |
| 20 | 40 | 36 | 4 | underlying inscriptions visible - example 1 |
| 14.9 | 42.5 | 39.1 | 3.4 | underlying inscriptions visible |
| 9.5 | 45.2 | 41.7 | 3.6 | underlying inscriptions visible |
| 6.5 | 46.7 | 43.1 | 3.7 | thermochromic semi-transparent image not visible |

EXAMPLE 3

A polycarbonate film (not sensitive to laser radiation) containing a blue thermochromic layer and with an activation temperature of 36° C. is arranged on a film which is sensitive to laser marking, sold by BAYER MATERIALS SCIENCE under the reference MAKROFOL ID® (comprising carbon black).

A thermochromic ink is prepared, comprising:
10% by weight of thermochromic pigments (capsules),
46% by weight of methyl methacrylate copolymer as a transparent binder, and
29% by weight of dipropylene glycol monomethyl ether,
11% of ethyl 3-ethoxypropanoate,
4% by weight of 2-hydroxyphenyl-s-triazine (anti-UV additive).

The thermochromic ink has a viscosity in the order of 7 Pa·s.

The leuco dye contained in the thermochromic microcapsules is "Crystal Violet Lactone". These thermochromic capsules are sold by the company Gem'innov® (Gémenos, France). The thermochromic capsules have an average size of 10 μm. The organic liquid contained in the thermochromic capsules is a fatty acid ester.

The thermochromic layer thus comprises a thermochromic image which is semi-transparent below the activation temperature and is transparent above the activation temperature.

The polycarbonate film (not sensitive to the laser) containing the semi-transparent thermochromic image arranged on a film comprising a laser marking layer is hot laminated under pressure with other polycarbonate layers.

A marking laser (Nd:YAG—1064 nm) of the DPSS ("Diode Pulsed Solid State") type sold by the company IXLA under the name XP24® (business model) is used with standard settings (speed: 1000 mm/s; frequency: 20 kHz) so as to form a binary, black and white photo (or "bitmap") of a female face through the semi-transparent thermochromic image and within the laser marking layer.

A transparent multilayer data medium is obtained which comprises a blue semi-transparent printed image and a black mark, representing a face, obtained by laser marking, arranged beneath said semi-transparent printed image, said semi-transparent printed image allowing the mark obtained by laser etching to be seen (in the activated state and also in the non-activated state of the thermochromic pigments).

EXAMPLE 4

A multilayer data medium is formed as per example 3, replacing the blue thermochromic capsules with pink thermochromic capsules sold by the company Gem'innov® (Gémenos, France). The thermochromic ink comprises 20% by weight of pink thermochromic capsules.

A transparent multilayer data medium is obtained which comprises a pink semi-transparent printed image and a black mark, representing a face, obtained by laser marking, arranged beneath said semi-transparent printed image, said semi-transparent printed image allowing the mark obtained by laser etching to be seen (in the activated state and also in the non-activated state of the thermochromic pigments).

EXAMPLE 5

A multilayer data medium is formed as per example 3, replacing the blue thermochromic capsules with red thermochromic capsules sold by the company Gem'innov® (Gemenos, France). The thermochromic ink comprises 16% by weight of red thermochromic capsules.

A transparent multilayer data medium is obtained which comprises a red semi-transparent printed image and a black mark, representing a face, obtained by laser marking, arranged beneath said semi-transparent printed image, said semi-transparent printed image allowing the mark obtained by laser etching to be seen (in the activated state and also in the non-activated state of the thermochromic pigments).

EXAMPLE 6

A multilayer data medium is formed as per example 3 but using an ultraviolet marking laser instead of an infrared laser.

A UV marking laser (Nd:YVO4—355 nm) of the DPSS ("Diode Pulsed Solid State") type sold by the company TRIUMPH under the name TRUMARK 6330® is used with standard settings (speed: 1000 mm/s; frequency: 20 kHz) so as to form a binary, black and white photo (or "bitmap") of a female face through the semi-transparent thermochromic image.

A transparent multilayer data medium is obtained which comprises a blue semi-transparent printed image and a black mark, representing a face, obtained by laser marking, arranged beneath said semi-transparent printed image, said semi-transparent printed image allowing the mark obtained by laser etching to be seen (in the activated state and also in the non-activated state of the thermochromic pigments).

All of these examples show that it is possible to form laser marking with a wavelength from the ultraviolet spectrum range to the infrared spectrum range, through a semi-transparent image in accordance with the invention.

The invention can comprise a large number of embodiment variants. In particular, the thermochromic semi-transparent printed image can be formed on a face of a transparent layer of the official document itself, the multilayer data medium in accordance with the invention being formed of this transparent layer bearing this thermochromic semi-transparent printed image and of a marking layer in accordance with the invention.

The invention claimed is:

1. Method for manufacturing a multilayer data medium in which:
    a multilayer data medium is selected comprising at least one security layer and at least one layer, named marking layer, which is sensitive to laser marking radiation, said marking layer being arranged at least in part facing said security layer,
    said security layer comprises at least one printed image comprising at least one thermochromic pigment adapted to change colour upon a predetermined temperature variation,
    in a marking step, at least one mark is formed in said marking layer using said laser marking radiation through said printed image, wherein:
    said printed image is a polychromatic coloured, semi-transparent printed image which causes at least one semi-transparent visible pattern to appear in a first state, named non-activated state, at at least a first temperature, allowing, after said marking step, said mark to be seen through this image, said pattern not being visible in a second state, named activated state, at at least a second temperature which is greater than the first temperature,
    said printed image is prepared from at least one printing composition comprising at least one transparent binder and a predetermined proportion of thermochromic pigments adapted to form the semi-transparent printed image allowing said mark to be seen through this image in the non-activated state of the thermochromic pigments,
    wherein the at least one mark is of a colour or shade different than a colour or shade of the semi-transparent printed image, and
    wherein said semi-transparent image is printed in accordance with a four-colour process.

2. Method according to claim 1, wherein said semi-transparent image is printed with a number of lines greater than 80 lines per inch.

3. Method according to claim 1, wherein said transparent binder is formed of one or more transparent polymeric binders.

4. Method according to claim 1, wherein said semi-transparent image is printed using at least one printing composition comprising at least one thermochromic pigment formed of capsules comprising at least one leuco dye, at least one weak acid and at least one solvent.

5. Method according to claim 1, wherein said semi-transparent image is printed using at least one printing composition comprising between 9% and 22% by weight of thermochromic pigments.

6. Method according to claim 1, wherein said semi-transparent image is printed by successively printing:
    a first printing composition comprising at least one cyan thermochromic pigment,
    a second printing composition comprising at least one magenta thermochromic pigment,
    a third printing composition comprising at least one yellow thermochromic pigment, and
    a fourth printing composition comprising at least one black thermochromic pigment.

7. Method according to claim 1, wherein the security layer comprises at least one layer formed of at least one material selected from the group formed of transparent thermoplastic materials and transparent synthetic papers.

8. Method according to claim 1, wherein the security layer comprises at least one layer formed of at least one material selected from the group formed of transparent polycarbonates, transparent polyesters, transparent PVC, polyurethane varnishes and vinyl varnishes.

9. Multilayer data medium comprising:
at least one security layer comprising at least one printed image comprising at least one thermochromic pigment adapted to change colour upon a predetermined temperature variation,
at least one layer, named marking layer, which is sensitive to laser marking radiation comprising at least one mark formed using said laser marking radiation, said marking layer being arranged at least in part facing said security layer, wherein:
said printed image is a polychromatic coloured, semi-transparent printed image which causes at least one semi-transparent visible pattern to appear in a first state, named non-activated state, at at least a first temperature, allowing said mark formed using the laser marking radiation to be seen, said pattern not being visible in a second state, named activated state, at at least a second temperature which is greater than the first temperature,
said printed image is prepared from at least one printing composition comprising at least one transparent binder and a predetermined proportion of thermochromic pigments adapted to form a semi-transparent printed image allowing said mark to be seen through this image in the non-activated state of the thermochromic pigments,
wherein the at least one mark is of a colour or shade different than a colour or shade of the semi-transparent printed image, and
wherein said semi-transparent image is printed in accordance with a four-colour process.

10. Medium according to claim 9, wherein said semi-transparent image is arranged at least in part facing said marking layer.

11. Medium according to claim 9, wherein said semi-transparent image extends across the entire transparent security layer.

12. Medium according to claim 9, wherein the medium is borne by a support film arranged on at least one portion of the surface of an outer layer of said multilayer data medium.

13. Official document comprising a surface portion having inscriptions, and at least one multilayer data medium according to claim 9 applied to the surface portion.

* * * * *